(12) United States Patent
Johnson et al.

(10) Patent No.: US 10,272,647 B2
(45) Date of Patent: Apr. 30, 2019

(54) GRAPHENE AND POLYMER-FREE METHOD FOR TRANSFERRING CVD GROWN GRAPHENE ONTO HYDROPHOBIC SUBSTRATES

(71) Applicant: CORNING INCORPORATED, Corning, NY (US)

(72) Inventors: Benedict Yorke Johnson, Horseheads, NY (US); Prantik Mazumder, Ithaca, NY (US); Kamal Kishore Soni, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 493 days.

(21) Appl. No.: 14/968,264

(22) Filed: Dec. 14, 2015

(65) Prior Publication Data

US 2016/0176162 A1 Jun. 23, 2016

Related U.S. Application Data

(60) Provisional application No. 62/094,584, filed on Dec. 19, 2014.

(51) Int. Cl.
*B32B 9/00* (2006.01)
*B32B 17/06* (2006.01)
(Continued)

(52) U.S. Cl.
CPC ............ *B32B 17/06* (2013.01); *B32B 9/007* (2013.01); *B32B 18/00* (2013.01); *B32B 37/025* (2013.01);
(Continued)

(58) Field of Classification Search
CPC ......... B32B 17/06; B32B 38/00; B32B 18/00; B32B 37/025; B32B 37/18; B32B 9/007; B32B 2250/02; B32B 2313/04; B32B 2315/02; B32B 2315/08; C01B 32/194; C23F 1/18; C04B 2237/52; C04B 2237/86

See application file for complete search history.

(56) References Cited

U.S. PATENT DOCUMENTS 8,419,880 B2    4/2013  Cho et al.
9,828,285 B2 *  11/2017 Johnson ................. C03C 15/00
(Continued)

FOREIGN PATENT DOCUMENTS

CN    102592973    4/2014
CN    102795619    7/2014

OTHER PUBLICATIONS

Lin et al; "A Direct and Polymer-Free Method for Transferring Graphene Grown by Chemical Vapor Deposition to Any Substrate"; ACSNANO; vol. 8, No. 2 1784-1791; 2014.
Regan et al; "A Direct Transfer of Layer-Area Graphene"; Applied Physics Letters; 96; 113102 (2010).
PCT/US2015/065930 Search Report; dated Apr. 7, 2016; 5 Pgs; EPO.

*Primary Examiner* — Anita K Alanko
(74) *Attorney, Agent, or Firm* — Svetlana Z. Short

(57) ABSTRACT

Described herein are methods for improved transfer of graphene from formation substrates to target substrates. In particular, the methods described herein are useful in the transfer of high-quality chemical vapor deposition-grown monolayers of graphene from metal, e.g., copper, formation substrates via non-polymeric methods. The improved processes provide graphene materials with less defects in the structure.

17 Claims, 9 Drawing Sheets

(51) Int. Cl.
  *B32B 18/00* (2006.01)
  *B32B 37/00* (2006.01)
  *B32B 37/18* (2006.01)
  *B32B 38/00* (2006.01)
  *C01B 32/194* (2017.01)
  *C23F 1/18* (2006.01)

(52) U.S. Cl.
  CPC .............. *B32B 37/18* (2013.01); *B32B 38/00* (2013.01); *C01B 32/194* (2017.08); *B32B 2250/02* (2013.01); *B32B 2313/04* (2013.01); *B32B 2315/02* (2013.01); *B32B 2315/08* (2013.01); *C04B 2237/52* (2013.01); *C04B 2237/86* (2013.01); *C23F 1/18* (2013.01)

(56) References Cited

U.S. PATENT DOCUMENTS

| | | | |
|---|---|---|---|
| 9,941,380 B2* | 4/2018 | Liu | ................... H01L 29/66045 |
| 2011/0048625 A1 | 3/2011 | Caldwell et al. | |
| 2012/0080658 A1* | 4/2012 | Yang | ..................... B82Y 10/00 |
| | | | 257/9 |
| 2012/0244358 A1 | 9/2012 | Lock et al. | |
| 2013/0220530 A1 | 8/2013 | Gong et al. | |
| 2013/0299077 A1 | 11/2013 | Hong et al. | |
| 2017/0154975 A1* | 6/2017 | Liu | .................... H01L 21/0212 |

\* cited by examiner

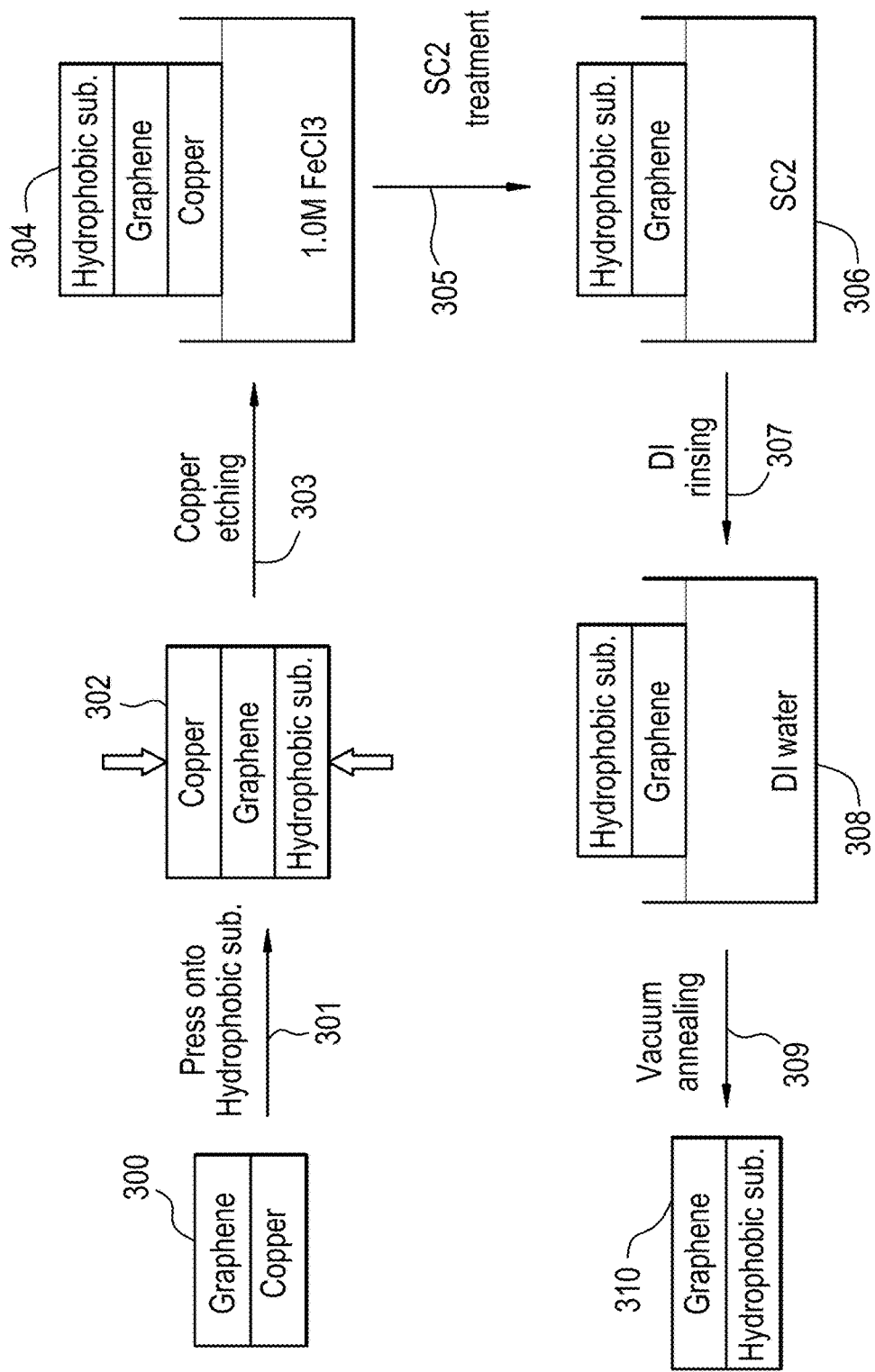

GRAPHENE AND POLYMER-FREE METHOD FOR TRANSFERRING CVD GROWN GRAPHENE ONTO HYDROPHOBIC SUBSTRATES

This application claims the benefit of priority under 35 U.S.C. § 119 of U.S. Provisional Application Ser. No. 62/094,584 filed on Dec. 19, 2014 the content of which is relied upon and incorporated herein by reference in its entirety.

FIELD

Described herein are methods for improved transfer of graphene from formation substrates to target substrates. In particular, the methods described herein are useful in the transfer of high-quality chemical vapor deposition-grown monolayers of graphene from metal, e.g., copper, formation substrates.

TECHNICAL BACKGROUND

Graphene is a two-dimensional monolayer of $sp^2$-bonded carbon atoms that has been attracting great interest following its experimental isolation by the mechanical cleavage of graphite. Its unique physical properties, such as high intrinsic carrier mobility (~200,000 $cm^2/Vs$), quantum electronic transport, tunable band gap, high mechanical strength and elasticity, and superior thermal conductivity, make graphene promising for many applications, including high speed transistors, energy/thermal management, and chemical/biological sensors. As the current generation of silicon-based devices reach their fundamental minimum size limit in the coming years, graphene will provide an opportunity to design even smaller devices. Since graphene remains conductive and stable at the molecular level, it is in a position to provide the next generation of low power electronics.

Since the first isolation of graphene by mechanical exfoliation, various methods have been devised to produce graphene. So far, graphene with the best electronic properties has been synthesized by mechanical exfoliation from Highly Ordered Pyrolytic Graphite (HOPG), which is on the order of tens of micrometers in size. Graphene can also be produced by chemical reduction of graphite oxide, high temperature annealing of single crystal silicon carbide, and chemical vapor deposition (CVD) on metal substrates. These techniques have been employed in demonstrating good quality graphene transistors. However, the only one that has the promise of becoming an inexpensive and manufacturable technology for deposition of reasonably high quality graphene is CVD, which has been one of the most-used thin film fabrication techniques in silicon very-large-scale integration (VLSI). The method mainly involves the adsorption, decomposition and segregation of a carbon-containing precursor on transition metal surface at an elevated temperature either at low or atmospheric pressure, which results in graphene synthesis. In particular, recent developments on uniform single layer deposition of graphene on copper foils over large areas have allowed access to high quality material. However, for the outstanding properties of graphene to be fully utilized, the synthesized graphene must be able to be transferred from the formation substrate to a variety of other target substrates. Particularly, in order for electrical current to flow through graphene devices as opposed to being shorted out by a conducting substrate, graphene must be removed from the conducting catalyst surface and transferred onto an insulating surface. While a number of processes have been developed to aid in this transfer, there currently remains an unmet need for improved processes to effectively and efficiently transfer graphene to target substrates.

SUMMARY

A first aspect comprises a process comprising forming a graphene layer having a pristine surface and a non-pristine surface on a formation substrate, wherein the pristine surface is the surface in contact with the formation substrate; transferring a graphene layer formed on a formation substrate to a target substrate by: contacting the non-pristine surface of the graphene layer with the target substrate with sufficient force to adhere the graphene to the target substrate, and separating the formation substrate and target substrate, wherein the target substrate comprises a material having a hydrophobic surface having a contact angle of from about 90° to about 150° and wherein, after transferring, the pristine surface of the graphene layer has less than 5 atom % organic impurities. In some embodiments, the target substrate is an organic material. In some embodiments, the target substrate comprises an inorganic material, such a glass, glass ceramic, or ceramic. When the target substrate is a glass, it may comprise a thermally or chemically tempered glass, or a flexible glass substrate having a thickness less than or equal to about 0.5 mm.

In some embodiments of the process, the contacting step comprises physically pressing the formation and target substrate together. In such embodiments, the pressing step may be done at pressures of 100 psi or greater.

In some embodiments of the process, the target and formation substrates are separated via an etching process.

In some embodiments, the process further comprises the step of modifying the target substrate to form a hydrophobic surface. The hydrophobic surface may be formed via chemical, thermal, physical, or electrical methods. The target substrate may comprise the hydrophobic surface or it may further comprise one or more surface layers or coatings that are formed or modified to create a hydrophobic surface. The one or more surface layers or coatings may comprise an inorganic or organic material. In some embodiments, the coatings may comprise a silane.

A second aspect comprises the articles formed by the processes described herein. In some embodiments, the article comprises a glass, glass ceramic, or ceramic substrate comprising at least one chemically-modified, hydrophobic surface having a contact angle of from about 90° to about 150°, a graphene layer comprising a pristine surface having less than 5 atom % organic impurities and a non-pristine surface, and wherein the hydrophobic surface and the non-pristine surface contact each other. In some embodiments, the graphene layer has a coverage level of about 10% or greater. In some embodiments, the hydrophobic surface comprises an organic coating. In some embodiments, the organic coating is a silane. In some embodiments, the target substrate is an organic material. In some embodiments, the target substrate comprises an inorganic material, such a glass, glass ceramic, or ceramic. When the target substrate is a glass, it may comprise a thermally or chemically tempered glass, or a flexible glass substrate having a thickness less than or equal to about 0.5 mm.

Additional features and advantages will be set forth in the detailed description which follows, and in part will be readily apparent to those skilled in the art from the description or recognized by practicing the embodiments as described in the written description and claims hereof, as well as in the appended drawings.

It is to be understood that both the foregoing general description and the following detailed description are merely exemplary, and are intended to provide an overview or framework for understanding.

BRIEF DESCRIPTION OF THE DRAWINGS

The accompanying drawings are included to provide a further understanding, and are incorporated in and constitute a part of this specification.

FIG. 3 is a schematic illustration of the transfer process of polymer-free method developed in the invention for transferring CVD-grown monolayer graphene. The method significantly decreases the transfer steps compared to the traditional PMMA or TRT methods.

DETAILED DESCRIPTION

Figure 1:
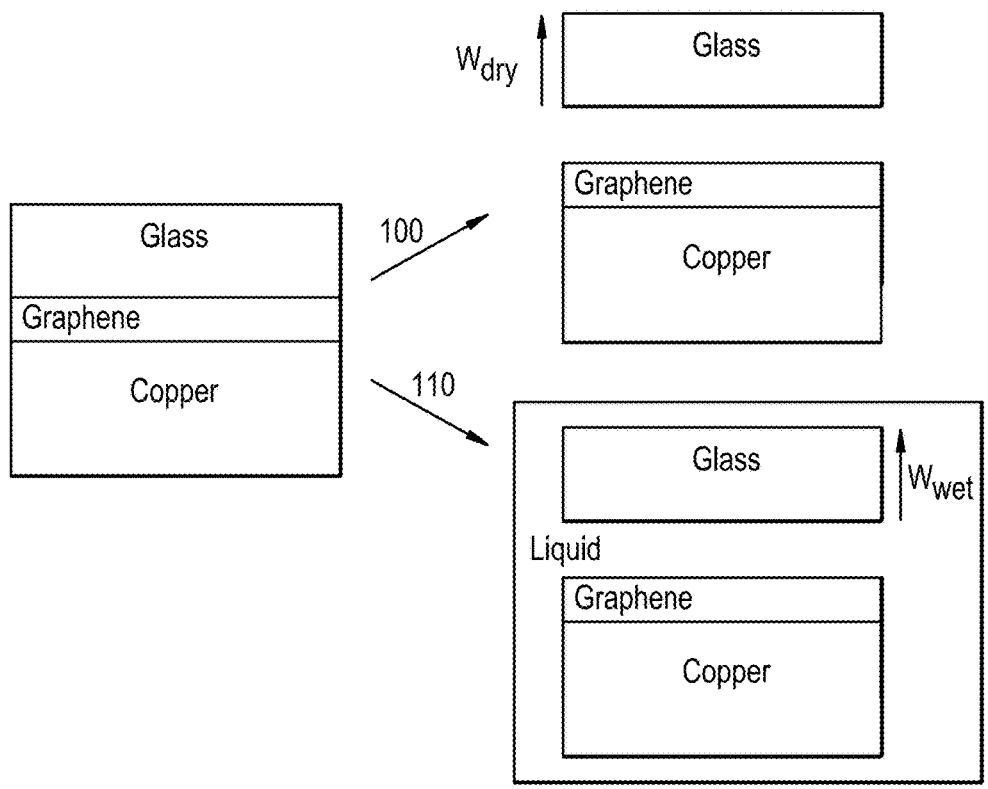
FIG. 1 is a schematic showing the adhesion/delamination phenomena at the interfaces within the copper/graphene/glass stack.

Before the present materials, articles, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps. Where comprise, or variations thereof, appears the terms "consists essentially of" or "consists of" may be substituted.

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As noted above, various methods have been developed to transfer graphene onto different substrates. Currently, the most commonly used transfer methods rely on polymer-assisted transfer processes, in which a polymer layer such as polymethyl methacrylate (PMMA), polydimethylsiloxane (PDMS) or thermal released tape (TRT) is used as temporary rigid support to maintain the graphene film integrity and to prevent folding, tear and wrinkles while the growth substrate (Cu, Ni) is chemically etched. In general, polymer-assisted transfer methods have the advantages of easy handling and processing. However, the use of these polymers can contaminate the graphene due to the strong dipole interactions between the polymer residue and the chemical groups on graphene. The detrimental effect of the polymer residues in graphene has been recognized and include introduction of variety of defects into the transferred graphene layer such as by the p-doping effect and by impurity scattering, which reduces mobility. To resolve the polymer contamination issues incurred during the graphene transfer process, various methods have been attempted, such as thermal annealing, chemical cleaning, and mechanical cleaning; however, complete removal of covalently bound polymeric residues remains limited. For example, annealing above 300° C. in a vacuum can minimize surface residues on graphene. However, this process simultaneously induces close contact between graphene and the roughened substrate surface, which significantly affects the electrical properties of graphene devices. Mechanical cleaning by an atomic force microscopy (AFM) tip has also been introduced, but it is extremely time consuming and inefficient because it works by "scratching"—one by one—several hundred nanometers of polymer residue with a single AFM tip.

One of the problems that had prevented direct transfer of graphene from formation surfaces onto an inorganic target substrate, such as glass, is that during the etching process—as the target substrate-graphene-formation substrate stack is submerged in the liquid—the substrate tends to delaminate from the graphene. The fact that such delamination does not occur when the substrate is a polymer hints at interfacial phenomena. While not wanting to be held to any particular theory, it is reasonable to believe that these inorganics may not work as well is that clean glass and other inorganic surfaces are often highly polar in nature and have high surface energy, which renders them hydrophilic. The etchant liquid, more often an aqueous solution, is also polar. This leads to strong polar-polar coupling between the glass surface and the etchant liquid resulting in penetration of the liquid between the glass and the graphene. The graphene sheet on the other hand is non-polar and only interacts with the glass substrate by dispersion force. The adhesion energy of liquid to the glass surface, therefore, is stronger than that between the graphene and the glass leading to delamination failure. In contrast, polymer substrates such as PMMA are practically non-polar and hence has much weaker polar-polar interaction with the liquid rendering them relatively hydrophobic. This leads to reduction of the propensity of the liquid to penetrate between graphene and polymer interface resulting in stable interface.

Aspects described herein overcome many of the aforementioned problems by providing polymer-free methods for graphene transfer. The methods described comprise growing graphene on a formation substrate, chemically modifying a transfer substrate to render it hydrophobic which stabilizes the graphene-target substrate interface and makes it stable against liquid penetration during etching, contacting the graphene with the target substrate, and chemically etching away the formation substrate. In particular, the method comprises three steps—first, the glass substrate is ultra-cleaned to remove surface contaminants and to enrich the surface with hydroxyls; second, the cleaned glass surface is functionalized with organic molecules, such as silanes, to impart hydrophobicity to the glass; and third, graphene grown on a formation substrate, in some embodiments by CVD, is transferred to the hydrophobic glass by the methods described herein. Each of these steps is described in detail herein.

It is necessary to consider two critical factors to ensure a successful graphene transfer onto the target substrates—the substrate's hydrophobicity and the contact between the target substrate and graphene. FIG. 1 provides a schematic of two possible scenarios for a target substrate (glass)-graphene-formation substrate (Copper) "sandwich" where the materials are separated under air or vacuum (100) or in liquid (110) imagine a three-layer composite of glass-graphene-copper in air or vacuum. If the surface energies of the glass (target) substrate and graphene are $\gamma_S$ and $\gamma_G$ respectively, and the interfacial energy between them is $\gamma_{SG}$, the work of adhesion or dry adhesion energy between them in air or vacuum is given by the Dupre equation:

$$W_{dry} = \gamma_S + \gamma_G - \gamma_{SG} \qquad (1)$$

The dry adhesion energy is, simply, the work required to separate the graphene from the glass in air or vacuum.

Using either the geometric mean model (Fowkes) or Harmonic mean model (Wu), the interfacial energy between graphene and the liquid could be written in terms of the individual surface energies as:

$$\gamma_{SG} = \gamma_S + \gamma_G - 2\left(\sqrt{\gamma_S^D \gamma_G^D} + \sqrt{\gamma_S^P \gamma_G^P}\right) \text{ (Geometric mean model)} \qquad (2)$$

and $$\gamma_{SG} = \gamma_S + \gamma_G - 4\left(\frac{\gamma_S^D \gamma_G^D}{\gamma_S^D + \gamma_G^D} + \frac{\gamma_S^P \gamma_G^P}{\gamma_S^P + \gamma_G^P}\right) \text{ (Harmonic mean model)} \qquad (3)$$

where, the superscripts D and P stand for the dispersion and the polar components of the surface energies. Substituting in the expressions in equation (1), one gets the following expression for dry adhesion energy between graphene and carrier:

$$W_{dry} = 2\left(\sqrt{\gamma_S^D \gamma_G^D} + \sqrt{\gamma_S^P \gamma_G^P}\right) \text{ (Geometric mean model)} \qquad (4)$$

or $$W_{dry} = 4\left(\frac{\gamma_S^D \gamma_G^D}{\gamma_S^D + \gamma_G^D} + \frac{\gamma_S^P \gamma_G^P}{\gamma_S^P + \gamma_G^P}\right) \text{ (Harmonic mean model)}. \qquad (5)$$

Since all the surface energy components are always positive, the dry adhesion energy is always positive which means it would require finite energy to separate the graphene from the glass once they are adhered to each other. It is not unreasonable to expect from equation (4) or (5) that higher the surface energy of the glass surface, the higher the dry adhesion energy. However, this simple and intuitive statement does not tell the whole story.

Now, looking at the wet adhesion energy between the graphene and the glass when they are submerged in a liquid—in our specific case, the developer liquid, L (FIG. 1)

$$W_{wet} = \gamma_{SL} + \gamma_{GL} - \gamma_{DG} \qquad (6)$$

Equation (6) is the same as equation (1) except the glass and graphene surface energy terms are replaced by glass-liquid and graphene-liquid interfacial energies. If the surface tension of the liquid is $\gamma_L$ and its contact angles on the glass substrate and graphene are $\theta_S$ and $\theta_G$ respectively, from Young's contact angle expression, one gets $$\cos\theta_S = \frac{\gamma_S - \gamma_{SL}}{\gamma_L} \qquad (7)$$

and $$\cos\theta_G = \frac{\gamma_G - \gamma_{GL}}{\gamma_L}. \qquad (8)$$

Substituting the expressions for contact angles in equation (6), one gets:

$$W_{wet} = W_{dry} - \gamma_L(\cos\theta_S + \cos\theta_G) \qquad (9)$$

Unlike the expression for dry adhesion energy (equation (4)), the wet adhesion energy could be either positive or negative depending on the contact angle of the liquid on the glass substrate. It is clear from equation (9) that the wettability of the glass substrate affects the wet adhesion energy of the graphene to the substrate. If the surface is highly wetting to the liquid, e.g. hydrophilic in the case of aqueous etchant solution when $\theta_S \to 0$, the value of wet adhesion energy approaches zero or even a negative value, leading to spontaneous delamination.

Aspects and embodiments described herein provide methods that render the wet adhesion energy as high and positive as possible by reducing the polarity of the solid substrate and increasing its dispersion component. Using similar expressions to equations (2) and (3) for $\gamma_{SL}$ and $\gamma_{GL}$ in equation (6) one gets:

$$\frac{W_{wet}}{2} = \gamma_L + \sqrt{\gamma_S^D}\left(\sqrt{\gamma_G^D} - \sqrt{\gamma_L^D}\right) + \quad (10)$$
$$\sqrt{\gamma_S^P}\left(\sqrt{\gamma_G^P} - \sqrt{\gamma_L^P}\right) - \sqrt{\gamma_G^D\gamma_L^D} - \sqrt{\gamma_G^P\gamma_L^P} \quad \text{(Geometric)}$$

$$\frac{W_{wet}}{4} = \left(\frac{\gamma_L}{2} + \frac{\gamma_S^D\gamma_G^D}{\gamma_S^D + \gamma_G^D} + \frac{\gamma_S^P\gamma_G^P}{\gamma_S^P + \gamma_G^P}\right) - \quad (11)$$
$$\left(\frac{\gamma_S^D\gamma_L^D}{\gamma_S^D + \gamma_L^D} + \frac{\gamma_S^P\gamma_L^P}{\gamma_S^P + \gamma_L^P} + \frac{\gamma_G^D\gamma_L^D}{\gamma_G^D + \gamma_L^D} + \frac{\gamma_G^P\gamma_L^P}{\gamma_G^P + \gamma_L^P}\right) \text{(Harmonic)}.$$

All the expressions have been written in general terms including all the dispersion and polar components of the three phases—the glass substrate, the liquid and the graphene. However, graphene is a non-polar material. Since it is composed of the same atoms, it cannot have any permanent dipoles. Therefore, the only surface energy component of graphene is the dispersion component. Substituting $\gamma_G^P = 0$ in the expressions for dry and wet adhesion energies, one gets:

$$\frac{W_{wet}}{2} = \gamma_L + \sqrt{\gamma_S^D}\left(\sqrt{\gamma_G^D} - \sqrt{\gamma_L^D}\right) - \quad (12)$$
$$\sqrt{\gamma_S^P\gamma_L^P} - \sqrt{\gamma_G^D\gamma_L^D} \quad \text{(Geometric mean)}$$

$$\frac{W_{wet}}{4} = \left(\frac{\gamma_L}{2} + \frac{\gamma_S^D\gamma_G^D}{\gamma_S^D + \gamma_G^D}\right) - \quad (13)$$
$$\left(\frac{\gamma_S^D\gamma_L^D}{\gamma_S^D + \gamma_L^D} + \frac{\gamma_S^P\gamma_L^P}{\gamma_S^P + \gamma_L^P} + \frac{\gamma_G^D\gamma_L^D}{\gamma_G^D + \gamma_L^D}\right) \text{(Harmonic mean)}.$$

As noted above, as the wet adhesion energy decreases and approaches 0 or a negative value, delamination of the graphene from the substrate is favored. In order for the graphene-glass interface to remain stable and not delaminate in the liquid, it is optimal to try to keep the wet adhesion energy a large positive number. It is clear from both equations (12) and (13) that the polar surface energy of the solid $\gamma_S^P$ is a destabilizing factor due to the strong coupling with the polar component of the liquid. Since the liquid, often a water-based etchant, is usually highly polar, large values of $\gamma_S^P$ could lead to negative overall wet adhesion values due to the $\sqrt{\gamma_S^P\gamma_L^P}$ term in equation (12) or the term $$\frac{\gamma_S^P\gamma_L^P}{\gamma_S^P + \gamma_L^P}$$

$$\gamma_S^P\gamma_L^P/\gamma_S^P + \gamma_L^P$$

in equation (13). This is indeed the case for most high energy solid surfaces, such as "normal" glass. The clean surface of glass is usually saturated with —OH groups leading to a polar surface energy component of the order of $\gamma_S^P \sim 40\text{-}45$ mJ/m$^2$. The water based etchant solution could have a polar component $\gamma_L^P \sim 40\text{-}55$ mJ/m$^2$ depending on its composition. Therefore, the polar-polar interaction between clean glass surface and the liquid could be greater than $\sim 50$mJ/m$^2$, leading to the delamination of graphene from the glass surface.

Figure 2A:
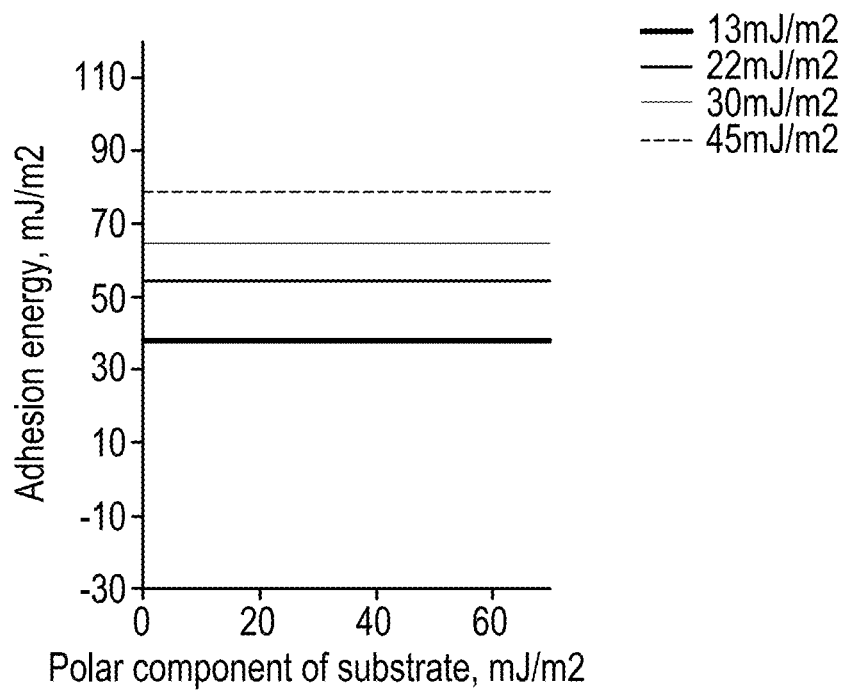
FIGS. 2A and 2B describe dry (FIG. 2A) and wet (FIG. 2B) adhesion energies between graphene and glass substrate as functions of dispersion and polar surface energy components of the glass substrate.
Figure 2B:
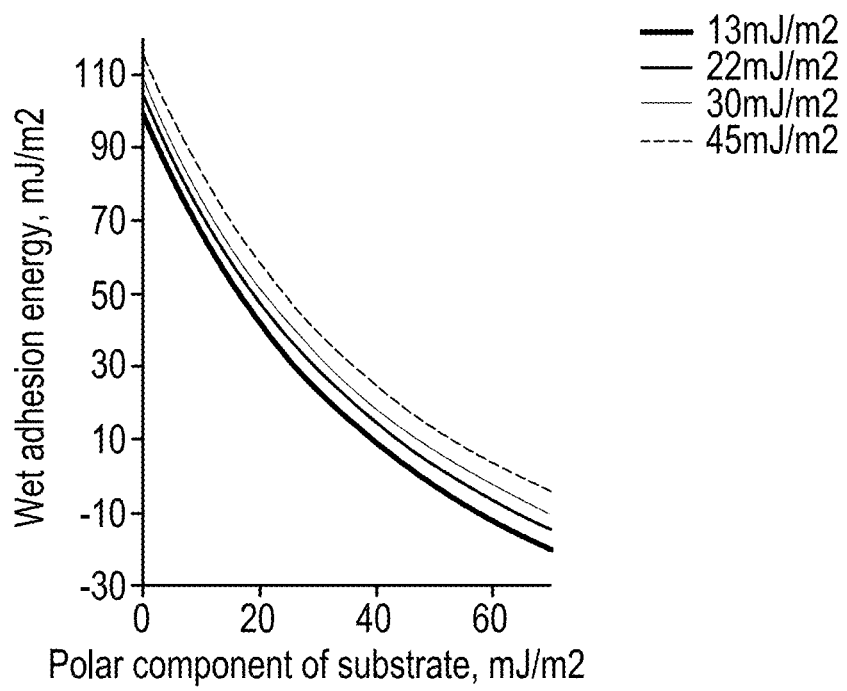

In FIGS. 2A and 2B we plot the calculated dry and wet adhesion energies between graphene and glass substrate as functions of dispersion and polar components of the glass substrate. Since graphene is non-polar it interacts with the glass surface only via dispersion forces. Therefore, as seen in FIG. 2A, the dry adhesion energy is an increasing function of the dispersion component of the glass substrate surface energy and is independent of the polar component of the glass surface energy. A high polar component of the substrate surface energy, therefore, does not have much effect on the dry adhesion energy between graphene and the substrate. On the other hand, high polar component of the glass surface drastically diminishes the wet adhesion energy between graphene and the glass. This is shown in FIG. 2B where we plot the wet adhesion energy as function of the polar component of surface energy corresponding to four dispersion energy components. As the polar component increases, the wet adhesion energy decreases due to the polar-polar interaction term between the glass surface and the etchant liquid (the term $\sqrt{\gamma_S^P\gamma_L^P}$ of equation (12) and the term $$\frac{\gamma_S^P\gamma_L^P}{\gamma_S^P + \gamma_L^P}$$

of equation (13)). For high enough polar components, the wet adhesion energy can even become negative. As noted previously, this situation will lead to spontaneous delamination of graphene from the glass surface upon immersion in the etchant liquid.

The polar surface energy component of clean and hydroxylated glass surface is usually of the order of or greater than 50 mJ/m$^2$. The dispersion component of glass is $\sim 30\text{-}40$ mJ/m$^2$. It is apparent from the theoretical discussion above as well as the quantitative calculations of FIG. 2B, that it would be difficult to keep graphene adhered to clean glass surface during the etching process. However, the calculations do show that lowering the polar energy component and increasing the dispersion component would increase the wet adhesion energy and stabilize the graphene-glass interface. In general, a high dispersion component in combination with a low polar component of the glass surface would be ideal. One way to achieve these conditions is by chemically modifying the target substrate surface prior to pressing against the graphene-coated copper.

Formation substrates that may be used in the methods described herein include all those known in the art. Copper is used as an example substrate throughout the description, but other substrate materials are acceptable and considered herein as well, such as nickel, steel, etc.

Graphene, as used herein, incorporates the ordinary meaning of the term and describes pure or nearly pure carbon in a one-atom thick layer where carbon atoms are densely packed in a regular sp$^2$-bonded atomic-scale hexagonal pattern. Graphene-like materials that are also considered herein further include nanoribbons, nanostripes, oxidized forms of graphene, chemically-modified or -substituted graphene, along with ligated or complexed graphene sheets, and multiple layers of any of the above.

Pristine graphene, as used herein, describes the graphene surface that is formed on the formation substrate and that does not contact any other surface during the formation and transfer process, leading to low levels of organic impurities on this surface. In some embodiments, the pristine surface has less than 10 atom %, less than 5 atom %, less than 3 atom % impurities. In some embodiments, the pristine surface has from about 1 atom % to about 5 atom % impurities.

Non-pristine graphene, as used herein, describes the graphene surface formed opposite the pristine surface and that contact the target substrate during the transfer process.

Target substrates that may be used with the processes and methods described herein include generally include any material that can modified, treated, synthesized, or created to have and retain a sufficiently high wet adhesion energy in a liquid solution, such as for example, an etching media solution, that the graphene stays adhered with sufficient adhesion to retain high structural and chemical purity. Target substrates may be made from either organic or inorganic materials. Organic materials include, but are not limited to, polymers, such as oxygen containing polymers, nitrogen containing polymers, esters, etc. One specific organic materials that may be used is PMMA. Inorganic substrates include, but are not limited to, inorganic oxides, nitrides, metals, glasses, glass ceramics, crystalline materials, minerals, etc. In particular, glass and glass ceramic substrates are advantageous in that they are inexpensive, easily available in many sizes, can be made very flat and smooth, and can easily be chemically modified to have the desired properties.

As noted above, the hydrophobicity of the target substrate is critical to graphene adhesion and the processes described herein. In some embodiments, the hydrophobicity of the target substrate is defined by the contact angle. Ideally, the target substrate will have a contact angle greater than about 90°. In some embodiments, the contact angle is from about 90° to about 150°. In some embodiments, it is possible that too high of a hydrophobicity can lead to wetting issues related to the various solvents used in graphene transfer. Therefore, in such embodiments, the contact angle may be from about 90° to about 120°.

In some embodiments, the process comprises one or more of the following steps:

Step 1: Glass surface cleaning—In order to improve the adhesion strength between the transferred graphene and the glass surface, a cleaning and surface treatment procedure can be used to remove contaminants present on the surface. An example cleaning and surface treatment procedure is presented herein and used to produce clean and hydrophilic surface on glass for graphene transfer. However, other cleaning methods known to skilled artisans may be equally applicable. The procedure has four sequential steps: first, the glass surface is cleaned using a 750 W $O_2$ plasma treatment for ~3 min, followed by Organic Clean (5:1:1 $H_2O:H_2O_2$: $NH_4OH$ solution) at ~25° C. for ~15 min, and Ionic Clean (5:1:1 $H_2O:H_2O_2$:HCl solution) at ~25° C. for ~15 min, ending with ~10 min ultrasonic rinse with DI water. Immediately before the transfer, the glass substrate is treated for ~30 seconds with 750 W $O_2$ plasma.

Step 2: Surface Chemical Modification-Hydrophobic Treatment—In some embodiments, the chemical modification treatment comprises the addition of organic functional groups to the glass surface after the cleaning procedure to render the glass surface hydrophobic. For example, the glass surface can be functionalized with silanes such as, but not limited to, trichlorooctadecylsilane (OTS), naphthyltrimethoxysilane (NAPTMS), perfluorooctyltriethoxysilane, (PFOTS), hexamethyldisilazane (HMDS) and azidopropyltrimethoxysilane, (AZPTMS). Alternatively, and depending on the target substrate, the target itself may be rendered hydrophobic via chemical, thermal, electrical, or physical processes. The purpose of the hydrophobic treatment is two-fold. First, is to promote adhesion between the glass and the graphene via hydrophobic to hydrophobic interaction between the glass surface and the graphene. Second, to prevent water molecules from permeating between the glass and the Gr/Cu stack and thus allows good contact to be maintained throughout the copper etching process.

Step 3: Transfer of monolayer graphene—FIG. 3 shows a schematic of embodied transfer process. The graphene (Gr) on copper (Cu) sample is first flattened between two cleaned glass slides. The Gr/Cu sample is placed on the hydrophobic treated glass. The Gr/Cu/glass sample 'stack' is then placed into a press, sandwiched between two steel plates. Pressure (180 psi) is applied to the stack for ~30 seconds. Pressures of greater than 100 psi are typically sufficient to transfer the graphene. Upper limits to the pressure may be limited by the target or formation substrate. The time length for applying pressure can be modified as necessary to obtain the desired transfer result.

After this, the sample stack is removed from the press and the graphene at the backside of the copper is removed. Removal may be done by any known means, but etching is particularly advantageous. For example, etching may be done via dipping the sample in 10 wt % nitric acid for 2 mins, etching with 1.0 M $FeCl_3$ solution at room temperature for 30 min, rinsing with DI water and drying at room temperature.

Figure 4:
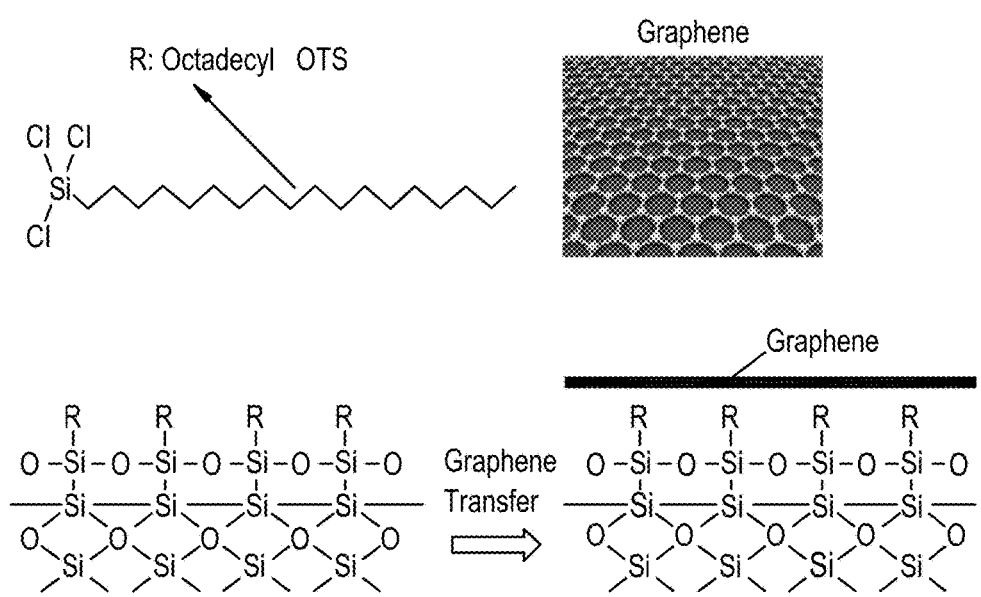
FIG. 4 is a schematic of the transfer of monolayer graphene onto a glass substrate silanized with octadecyltrichlorosilane (OTS). The functional group, R, is octadecyl.

An example of a chemically modified substrate as embodied herein is shown in FIG. 4. FIG. 4 is a pictorial representation of the graphene being transferred to the target substrate—in this case a $SiO_2$-type glass or crystal with a surface having octadecyl-containing siloxanes on the surface. The hydrophobic octadecyl groups provide a strong adhesion layer in the presence of a polar solvent.

EXAMPLES

The following examples are put forth so as to provide those of ordinary skill in the art with a complete disclosure and description of how the materials, articles, and methods described and claimed herein are made and evaluated, and are intended to be purely exemplary and are not intended to limit the scope. Efforts have been made to ensure accuracy with respect to numbers (e.g., amounts, temperature, etc.) but some errors and deviations should be accounted for. Only reasonable and routine experimentation will be required to optimize such process conditions.

Example 1

Figure 6A:
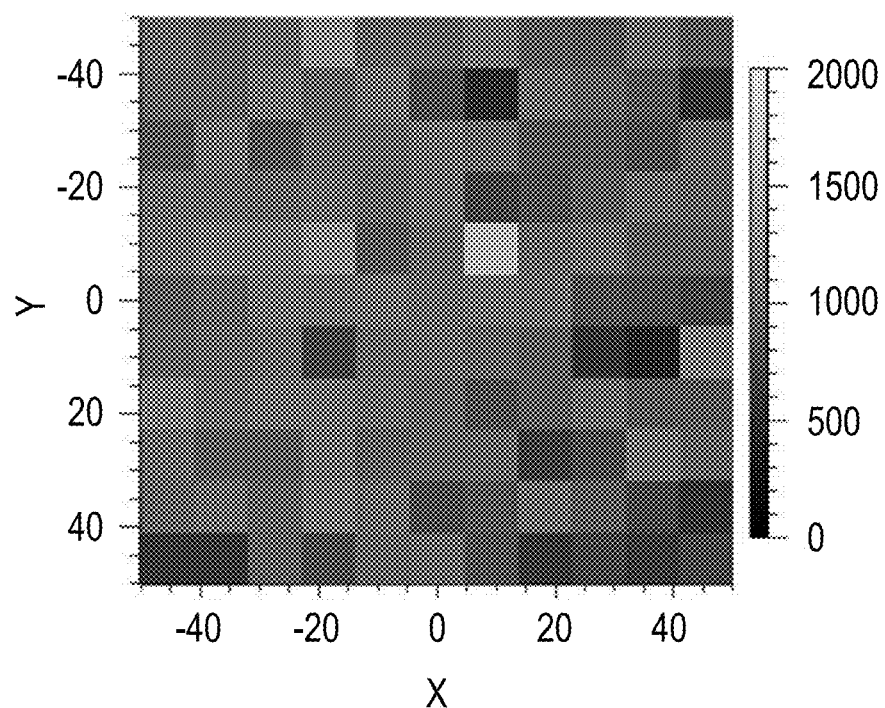
FIGS. 6A and 6B are a Raman mapping image of the 2D band (FIG. 6A) (mapping scale 100 μm×100 μm) and corresponding spectrum (FIG. 6B) of the monolayer graphene film on OTS treated Willow® glass sample transferred by the polymer-free method. The graphene coverage was~100%. The absence of a D peak in the spectrum attests to the high quality of the transferred graphene film.
Figure 6B:
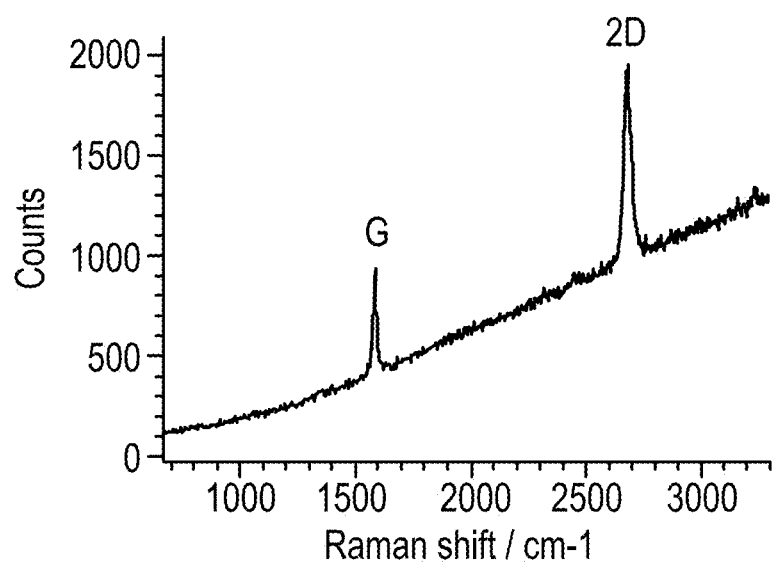

Transfer of Monolayer Graphene onto Octadecyltrichlorosilane (OTS) Treated Willow® Glass In Example 1, OTS-treated Willow® glass samples 25.4× 25.4 mm×150 µm thick are used for the transfer. The graphene source is CVD-grown monolayer graphene on copper obtained from Graphenea, Spain and is used as received. Prior to silanization, the Willow® glass samples are cleaned according to the surface cleaning procedure described above. Silanization of the samples is performed by dip coating in OTS solution containing 1.5 vol % OTS in Toluene for 5.0 hours. Post-treatment steps include rinsing in hexane and ethanol and baking at 110° C. for 30 min. Monolayer graphene is transferred onto the OTS-treated glass according to transfer procedure described in Step 3 above. The transferred films are characterized by Raman spectroscopy, and UV-vis spectrophotometry to respectively determine the continuity and quality and optical transmittance of the films. The results show that the transferred graphene is a continuous monolayer film with no defect density and good transmittance (see FIGS. 6A and 6B). The properties of the transferred film are presented in Table 2.

TABLE 2

| Sample ID | Sample Description | Film Coverage | Disorder/defect level, *$I_D/I_G$ (avg) | Sheet resistance (KΩ/sq) | % Visible Trans Gr film |
|---|---|---|---|---|---|
| OTS-WILLOW® | Graphene transferred onto OTS treated Willow® using polymer-free method | ~100 | ~0 | N/A | 97.7 |
| PFOTS-WILLOW® | Graphene transferred onto PFOTS treated Willow® using polymer-free method | ~100 | ~0 | N/A | 97.7 |
| OTS-EXG | Graphene transferred onto OTS treated EXG using polymer-free method | ~100 | <0.1 | N/A | 97.7 |
| AZPTMS-WILLOW® | Graphene transferred onto AZPTMS treated Willow® using polymer-free method | ~70 | ~0 | NA | — |
| HMDS-WILLOW® | Graphene transferred onto HMDS treated Willow® using polymer-free method | ~60 | ~0 | NA | — |
| WILLOW®-PMMA (Comparative Example 1) | Graphene transferred onto untreated treated Willow® using PMMA method | ~90 | <0.1 | 0.5-1.5 | 97.7 |

*$I_D/I_G$: The intensity ratio Raman "D" and "G" peaks, is commonly used to characterize disorder in graphene. The smaller the ratio, the smaller the number of defects in the graphene film.

Example 2

Figure 7A:
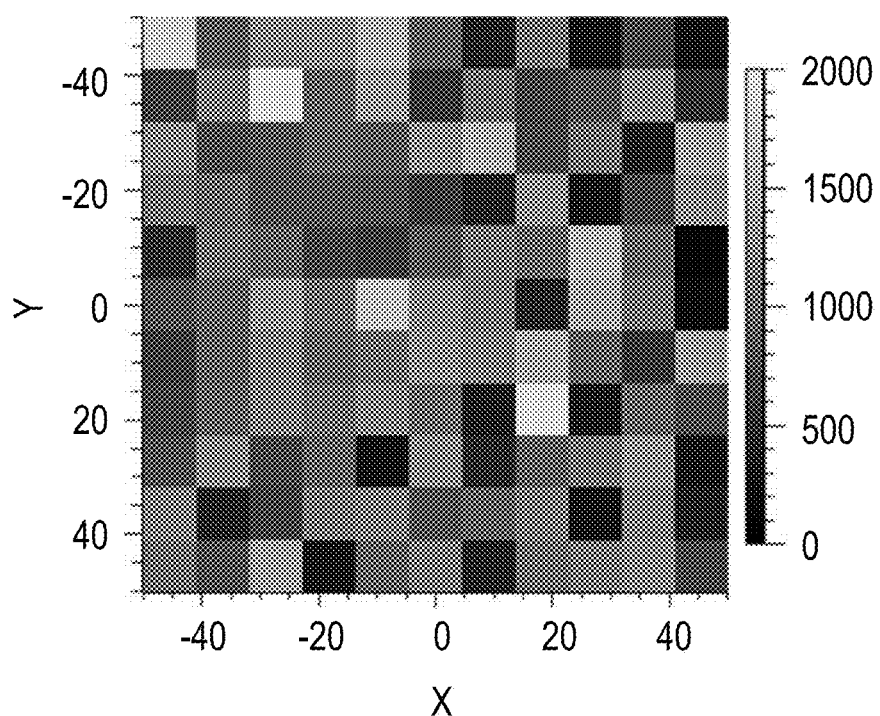
FIGS. 7A and 7B are a Raman mapping image of the 2D band (FIG. 7A) (mapping scale 100 mm×100 mm) and corresponding spectrum (FIG. 7B) of the monolayer graphene film on PFOTS treated Willow® glass sample transferred by the polymer-free method. The graphene coverage was ~100%. The absence of a D peak in the spectrum attests to the high quality of the transferred graphene film.
Figure 7B:
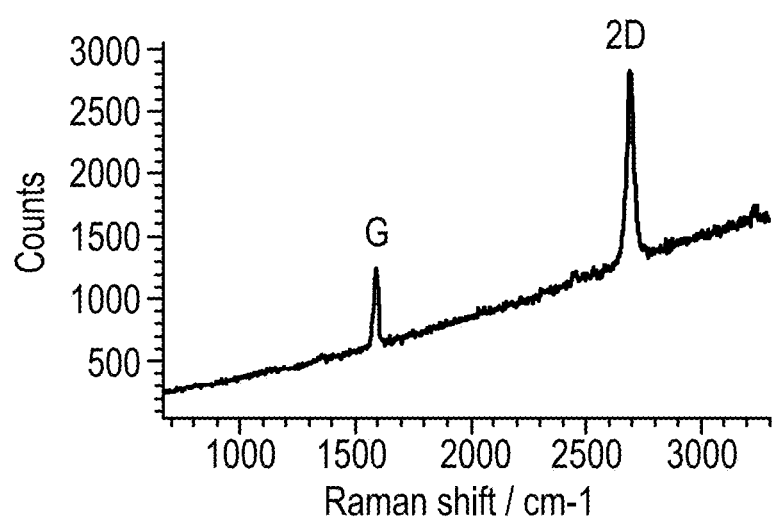

Transfer of Monolayer Graphene onto Perfluorooctyltriethoxysilane (PFOTS)-Treated Willow® Glass In Example 2, PFOTS-treated Willow® glass samples 25.4×25.4 mm ×150 µthick are used for the transfer. The graphene source and the pre-treatment of the Willow® glass samples are the same as in Example 1. Silanization of the samples are performed by dip coating in PFOTS solution containing 1.5 vol % PFOTS in methanol for 1.0 hour. Post-treatment steps include rinsing in methanol and baking at 110° C. for 30 min. The graphene transfer and characterization of the transferred film are performed in the same manner as in Example 1. The film's quality and coverage are the same as in Example 1 (see FIGS. 7A and 7B). The properties of the transferred film are presented in Table 2.

Example 3

Transfer of Monolayer Graphene onto OTS-Treated EXG Glass

Figure 8A:
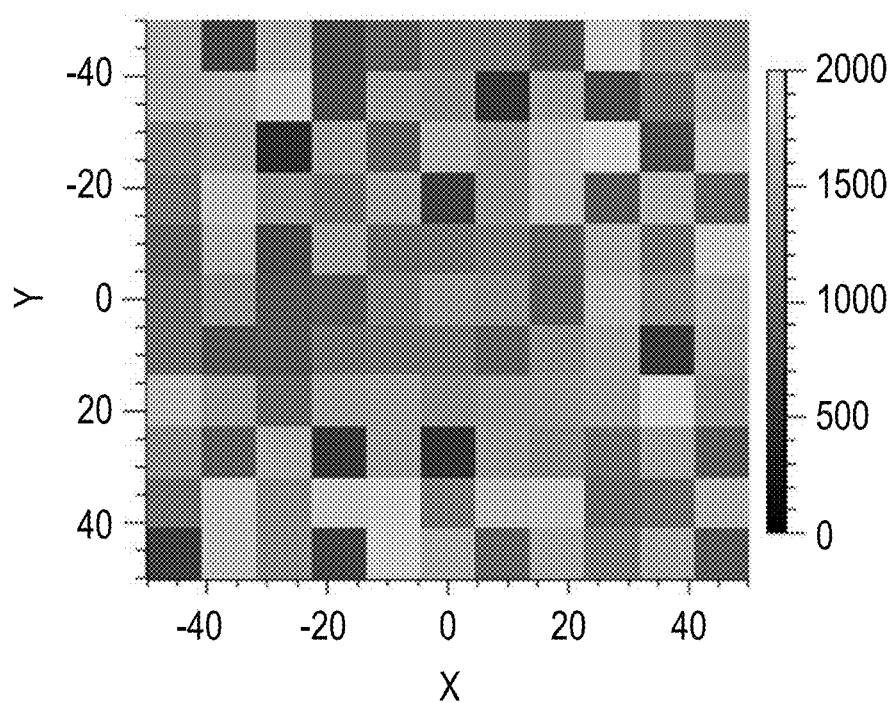
FIGS. 8A and 8B are a Raman mapping image of the 2D band (FIG. 8A) (mapping scale 100 μm×100 μm) and corresponding spectrum (FIG. 8B) of the monolayer graphene film on OTS-treated EagleXG® glass sample transferred by the polymer-free method. The graphene coverage was ~100%. The low intensity of the D peak across the domain indicates that the film has low defect density.
Figure 8B:
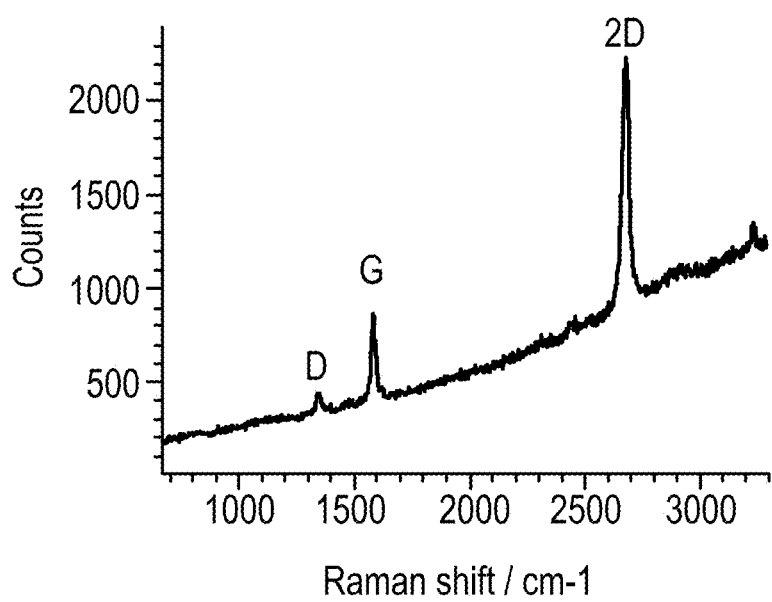

In Example 3, OTS-treated EagleXG® ("EXG") glass samples 25.4×25.4 mm×150 µm thick are used for the transfer. The graphene source and the pre-treatment of the EXG glass samples are the same as in Example 1. Silanization of the samples are performed by dip coating in OTS solution containing 3.2 vol % OTS, 2.5 vol % HCI % in toluene for 1.5 hours. Post-treatment steps includ rinsing in toluene and ethanol and baking at 110° C. for 30 min. The graphene transfer and characterization of the transferred film are performed in the same manner as in Example 1. The film is continuous with very low density of defect (see FIGS. 8A and 8B). The properties of the transferred film are presented in Table 2.

Comparative Example 1

Transfer of Monolayer Graphene onto Untreated Willow® Glass by the PMMA Method

Figure 5:
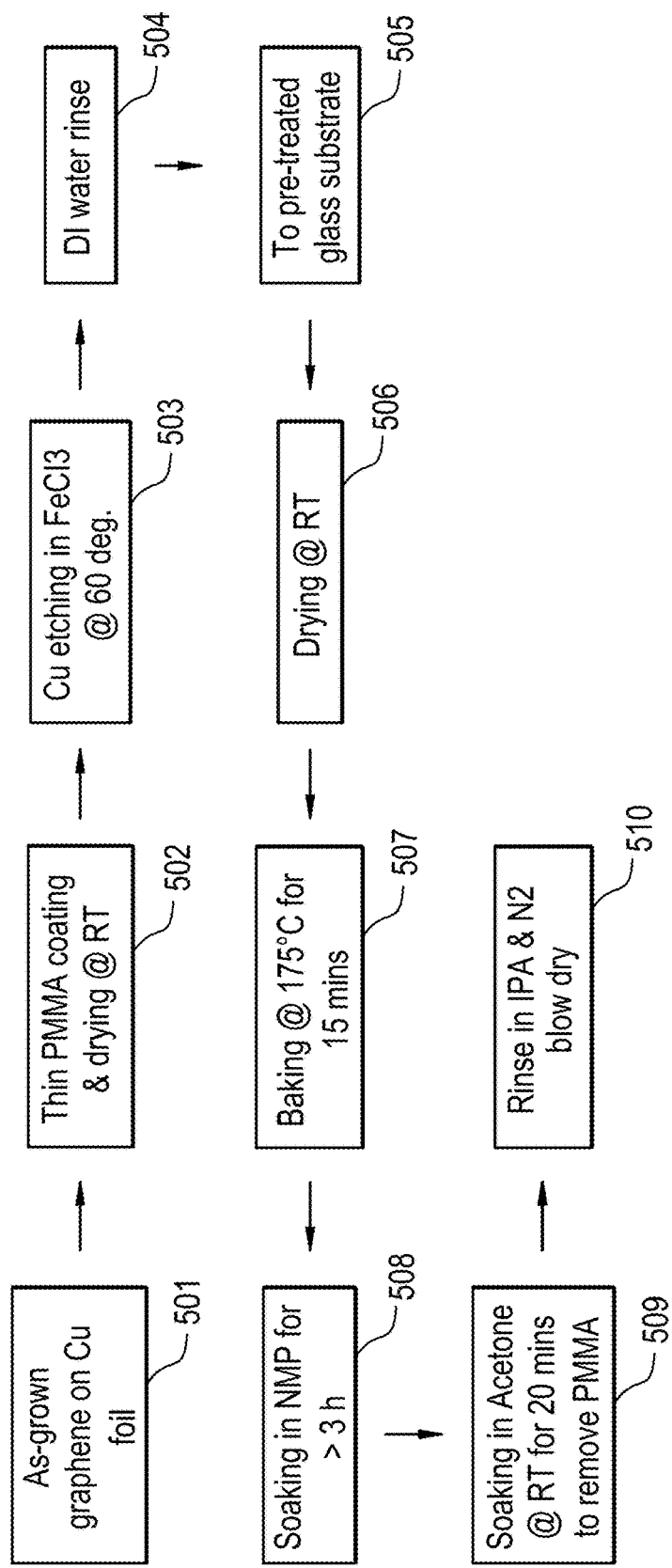
FIG. 5 is a flow chart of the transfer process of PMMA method used for transferring graphene in Comparative Example 1.
Figure 9A:
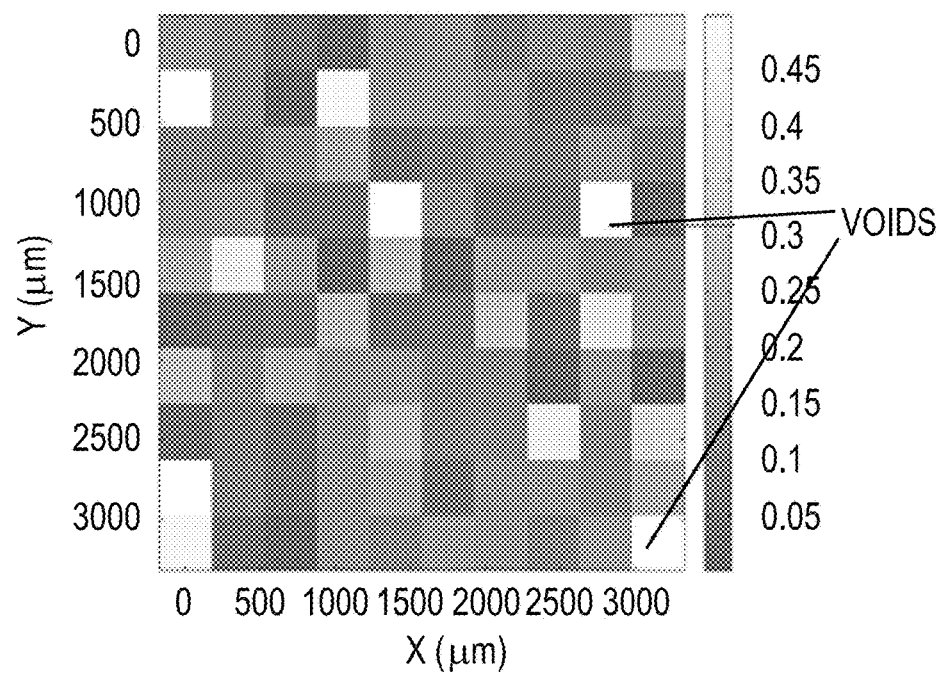
FIGS. 9A and 9B are a Raman mapping image of G/2D intensity ratio (FIG. 9A) and corresponding spectrum (FIG. 9B) of the monolayer graphene film on Willow® glass transferred by PMMAT method. The graphene coverage was ~90%. The low intensity D band across the domain indicates that the film has low defect density.
Figure 9B:
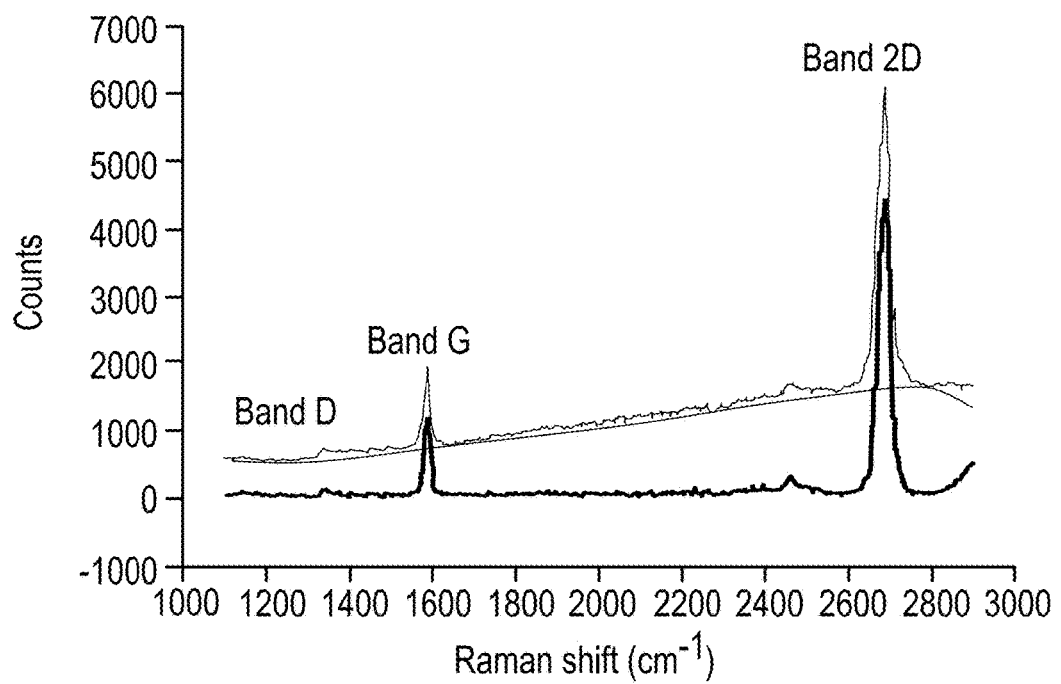

In Comparative Example 1, ultra-cleaned Willow® glass samples 25.4×25.4 mm×150 µm thick are used for the transfer. The graphene source is the same as in Example 1. The graphene films are transferred onto the Willow® samples by the PMMA method shown in FIG. 5. Thin PMMA is first spin-coated on top of Gr/copper foil at a spin speed of 4000 rpm for 50 s. The sample is then heated in an oven at 120° C. for 1 h to remove any solvent and floated on 1 M FeCl₃ solution to etch away the copper foil. After the remaining PMMA/Gr sample is rinsed in deionized (DI) water, the sample is transferred to the glass substrate. The graphene/PMM stack is dipped in NMP for 3.5 hours. The PMMA is dissolved using acetone and then rinsed in methanol-water (1:1 by volume). The Raman spectrum and mapping image are shown in FIGS. 9A and 9B. The measured properties of the transferred graphene obtained from ICFO are reported in Table 2. Several attempts are made without success to reproduce the PMMA transfer of graphene. However, the method requires very elaborate skills to carry out the transfer process.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A process comprising:
   a. forming a graphene layer having a pristine surface and a non-pristine surface on a formation substrate, wherein the pristine surface is the surface in contact with the formation substrate;

b. transferring the graphene layer formed on the formation substrate to a target substrate by:
  i. contacting the non-pristine surface of the graphene layer with the target substrate with sufficient force to adhere the graphene layer to the target substrate, and
  ii. separating the formation substrate and the target substrate,
wherein the target substrate comprises a material having a hydrophobic surface having a contact angle of from about 90° to about 150°; and
wherein, after transferring, the pristine surface of the graphene layer has less than 5 atom % organic impurities.

2. The process of claim 1, wherein the target substrate comprises an inorganic material.

3. The process of claim 1, wherein the inorganic material comprises a thermally or chemically tempered glass, or a flexible glass substrate having a thickness less than or equal to about 0.5 mm.

4. The process of claim 1, wherein the contacting step comprises pressing the formation substrate and the target substrates together at a pressure greater than 100 psi.

5. The process of claim 1, wherein the separating step comprises etching the formation substrate.

6. The process of claim 1, wherein the hydrophobic surface of the target substrate is created via a chemical, thermal, physical, or electrical method.

7. The process of claim 1, wherein the hydrophobic surface comprises a organic coating on the target substrate.

8. The process of claim 7, wherein the organic coating comprises a silane.

9. The process of claim 1, the process further comprising the step of chemically modifying the target substrate.

10. The process of claim 9, wherein the target substrate comprises an inorganic material.

11. The process of claim 10, wherein the inorganic material comprises a glass, glass ceramic, or ceramic.

12. The process of claim 11, wherein the inorganic material comprises a thermally or chemically tempered glass, or a flexible glass substrate having a thickness less than or equal to about 0.5 mm.

13. The process of claim 9, wherein the hydrophobic surface comprises a polymer coating on the target substrate.

14. The process of claim 13, wherein the polymer coating comprises a silane.

15. The process of claim 9, further comprising the step of cleaning the target substrate prior to chemically modifying the target substrate.

16. The process of claim 15, wherein cleaning comprises one or more of the following:
  a. cleaning with an $O_2$ plasma treatment;
  b. cleaning with an aqueous $H_2O_2$ and $NH_4OH$ solution; or
  c. cleaning with an aqueous $H_2O_2$ and HCl solution.

17. The process of claim 1, wherein the graphene layer has a coverage level of about 10% or greater.

* * * * *

UNITED STATES PATENT AND TRADEMARK OFFICE
CERTIFICATE OF CORRECTION

PATENT NO. : 10,272,647 B2
APPLICATION NO. : 14/968264
DATED : April 30, 2019
INVENTOR(S) : Benedict Yorke Johnson et al.

Page 1 of 1

It is certified that error appears in the above-identified patent and that said Letters Patent is hereby corrected as shown below:

In the Claims

In Column 14, Line 22, Claim 16, delete "$O_2$plasma" and insert -- $O_2$ plasma --, therefor.

Signed and Sealed this
Tenth Day of December, 2019

Andrei Iancu
*Director of the United States Patent and Trademark Office*